(12) United States Patent
Li et al.

(10) Patent No.: US 11,372,152 B2
(45) Date of Patent: Jun. 28, 2022

(54) BACKLIGHT MODULE AND DISPLAY DEVICE

(71) Applicants: Hefei BOE Vision-Electronic Technology Co., Ltd., Anhui (CN); BOE TECHNOLOGY GROUP CO., LTD., Beijing (CN)

(72) Inventors: Xiaojin Li, Beijing (CN); Guangning Hao, Beijing (CN)

(73) Assignees: Hefei BOE Vision-Electronic Technology Co., Ltd., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/417,548

(22) PCT Filed: Sep. 10, 2020

(86) PCT No.: PCT/CN2020/114517
§ 371 (c)(1),
(2) Date: Jun. 23, 2021

(87) PCT Pub. No.: WO2021/057493
PCT Pub. Date: Apr. 1, 2021

(65) Prior Publication Data
US 2022/0057567 A1 Feb. 24, 2022

(30) Foreign Application Priority Data
Sep. 29, 2019 (CN) .......................... 201910936775.2

(51) Int. Cl.
*F21V 8/00* (2006.01)
*G02F 1/1333* (2006.01)
*G02F 1/13357* (2006.01)

(52) U.S. Cl.
CPC .......... *G02B 6/0053* (2013.01); *G02B 6/0088* (2013.01); *G02F 1/133317* (2021.01); *G02F 1/133608* (2013.01)

(58) Field of Classification Search
CPC .................................................. G02F 1/133317
See application file for complete search history.

(56) References Cited

U.S. PATENT DOCUMENTS

| 2012/0086890 A1 | 4/2012 | Shimokawa et al. |
| 2014/0104872 A1 | 4/2014 | Shin et al. |

(Continued)

FOREIGN PATENT DOCUMENTS

| CN | 101545601 A | 9/2009 |
| CN | 102691985 A | 9/2012 |

(Continued)

OTHER PUBLICATIONS

Shin D. G. et al., Assessment of surface damage characteristics of polymeric optical sheets of LCD backlight unit, Polymer Testing, 2015, pp. 140-150, Elsevier Ltd.

(Continued)

*Primary Examiner* — Keith G. Delahoussaye
(74) *Attorney, Agent, or Firm* — IP & T Group LLP (57) ABSTRACT

A backlight module includes a frame, a first optical film and a fixing assembly. The frame has a near-display panel side and a far-display panel side in a direction perpendicular to a plane enclosed by the frame. The frame includes a frame portion and an extending portion disposed on an inside of the frame portion. The frame portion has at least one film fixing groove, a cross section of the film fixing groove has a stepped shape in a direction perpendicular to a plane enclosed by the frame portion and perpendicular to an edge of the frame portion where the film fixing groove is located. The film fixing groove has a first support surface and a (Continued)

second support surface, and the second support surface is farther away from the near-display panel side than the first support surface.

20 Claims, 6 Drawing Sheets

(56) References Cited

U.S. PATENT DOCUMENTS

| | | | |
|---|---|---|---|
| 2014/0176852 A1* | 6/2014 | Ha | G02F 1/133308 349/58 |
| 2014/0192289 A1 | 7/2014 | Zhang et al. | |
| 2014/0211124 A1 | 7/2014 | Huang et al. | |
| 2015/0362663 A1* | 12/2015 | Chiu | G02B 6/0068 362/606 |
| 2016/0223739 A1* | 8/2016 | Yoon | G02B 6/0088 |
| 2016/0259120 A1 | 9/2016 | Hsiao et al. | |
| 2017/0261769 A1 | 9/2017 | Horiguchi | |
| 2018/0192525 A1 | 7/2018 | Yun et al. | |

FOREIGN PATENT DOCUMENTS

| | | |
|---|---|---|
| CN | 102913821 A | 2/2013 |
| CN | 203215598 U | 9/2013 |
| CN | 203298101 U | 11/2013 |
| CN | 104315415 A | 1/2015 |
| CN | 204347391 U | 5/2015 |
| CN | 104698681 A | 6/2015 |
| CN | 105303969 A | 2/2016 |
| CN | 106125397 A | 11/2016 |
| CN | 107003560 A | 8/2017 |
| CN | 107908039 A | 4/2018 |
| CN | 207424463 U | 5/2018 |
| CN | 207636886 U | 7/2018 |
| JP | H11-337942 A | 12/1999 |
| JP | 2016-76324 A | 5/2016 |
| KR | 2003-0020526 A | 3/2003 |
| WO | 2016/018016 A1 | 2/2016 |

OTHER PUBLICATIONS

Gui S. X. et al., Study on the Performance of TFT-LCD with Different Optical Film Combinations, Optoelectronic Technology, Dec. 2018, pp. 271-273, vol. 38. No. 4.

First Office Action of priority application No. CN 201910936775.2 issued by the China Patent Office dated Jul. 26, 2021.

First Office Action issued by the China Patent Office dated Jul. 26, 2021.

* cited by examiner

BACKLIGHT MODULE AND DISPLAY DEVICE

CROSS-REFERENCE TO RELATED APPLICATIONS

This application is a national phase entry under 35 USC 371 of International Patent Application No. PCT/CN2020/114517 filed on d on Sep. 10, 2020, which claims priority to Chinese Patent Application No. 201910936775.2, filed on Sep. 29, 2019, which are incorporated herein by reference in their entirety.

TECHNICAL FIELD

The present disclosure relates to the field of display technologies, in particular, to a backlight module and a display device.

BACKGROUND

At present, a display screen with a high screen-to-body ratio (the screen-to-body ratio is used to indicate a ratio of an area of a display region actually used to display images to an area of an entire front surface of the display screen), especially a full screen (with the screen-to-body ratio reaching more than 80%, and close to 100%) has gradually become one of mainstream development directions in the field of display technologies.

A design structure of a display device tends to be thin and light. Moreover, the screen-to-body ratio of the display screen in the display device may be increased by reducing a width of a frame of the display screen.

SUMMARY

In an aspect, a backlight module is provided, and the backlight module includes a frame, a first optical film and a fixing assembly. The frame has a near-display panel side and a far-display panel side in a direction perpendicular to a plane enclosed by the frame. The frame includes a frame portion and an extending portion disposed on an inside of the frame portion. The frame portion has at least one film fixing groove, a cross section of the film fixing groove has a stepped shape in a direction perpendicular to a plane enclosed by the frame portion and perpendicular to an edge of the frame portion where the film fixing groove is located. The film fixing groove has a first support surface and a second support surface, and the second support surface is farther away from the near-display panel side than the first support surface. The extending portion has a third support surface, and the third support surface is farther away from the near-display panel side than the first support surface.

The first optical film includes a film body and at least one protrusion portion disposed on an edge of the film body. The edge of the film body is supported by the third support surface. The protrusion portion is connected to the edge of the film body, extends into the film fixing groove and is supported by the second support surface.

The fixing assembly includes a fixing block and a connection sheet. The fixing block is supported by the first support surface. One end of the connection sheet is connected to the fixing block, and another end of the connection sheet is connected to the protrusion portion of the first optical film.

In some embodiments, the frame portion further has a fourth support surface, and the fourth support surface is farther away from the far-display panel side than the first support surface. A surface of the fixing block away from the first support surface and the fourth support surface are located in a same plane.

In some embodiments, the first support surface includes a first region and a second region that are disposed opposite to each other, and a connection region connecting the first region and the second region. An orthogonal projection of the fixing block on a plane where the first support surface is located and any region of the first region, the second region and the connection region have an overlapping region. An orthogonal projection of the second support surface on the plane where the first support surface is located is located between the first region and the second region.

In some embodiments, the connection sheet includes a first connection portion and a second connection portion. The first connection portion is connected to the protrusion portion of the first optical film. The second connection portion is located between the fixing block and the connection region of the first support surface.

In some embodiments, the fixing block is configured to press the second connection portion on the first support surface.

In some embodiments, a dimension of the first connection portion is approximately equal to a dimension of the protrusion portion in a direction from the first region to the second region.

In some embodiments, the connection region is within an orthogonal projection of the second connection portion on the plane where the first support surface is located.

In some embodiments, a dimension of the protrusion portion is less than a distance between the first region and the second region in a direction from the first region to the second region.

In some embodiments, the film body and the frame portion have a distance therebetween.

In some embodiments, the backlight module further includes a shielding component, and the shielding component includes a shielding portion and a carrying portion. A portion of the edge of the film body is within an orthogonal projection of the shielding portion on a plane where the first optical film is located. One end of the carrying portion is connected to a surface of the shielding portion away from the first optical film, and another end of the carrying portion extends to a position where the fourth support surface is located and is supported by the fourth support surface.

An orthogonal projection of the fixing block of the fixing assembly on the reference surface is within an orthogonal projection of the shielding portion on a reference surface. The reference plane is a plane perpendicular to a direction in which the carrying portion extends to the position where the fourth support surface is located. The protrusion portion is within orthogonal projection of the carrying portion on the plane where the first optical film is located.

In some embodiments, an orthogonal projection of the shielding portion on a plane where the third support surface is located is located in the third support surface.

In some embodiments, the fixing block is connected to the first support surface.

In some embodiments, the backlight module further includes an adhesive layer bonding both the first region and the fixing block, and the second region and the fixing block, and a thickness of the adhesive layer is greater than or equal to a thickness of the second connection portion.

In some embodiments, the connection sheet is flexible, and a thickness of the protrusion portion is less than a distance between the second support surface and the first support surface in a direction perpendicular to a plane where the first optical film is located.

In some embodiments, the connection sheet is made of polyester.

In some embodiments, colors of the connection sheet and the fixing block are same as a color of the first optical film.

In some embodiments, the second support surface and the third support surface are located in a same plane.

In some embodiments, the backlight module further includes a light guide plate disposed on the far-display panel side, and a second optical film disposed between the light guide plate and the frame. An edge of the second optical film is pressed on the light guide plate by the extending portion of the frame.

In some embodiments, the backlight module further includes a backlight source, the backlight source is disposed on a side of the light guide plate. The fixing assembly is disposed on a side of the backlight module where the backlight source is disposed.

In another aspect, a display device is provided, the display device includes the backlight module as described in any of the above embodiments, and a display panel disposed on the near-display panel side of the frame. An edge of the display panel is supported by the frame portion of the frame.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on actual sizes of products, actual processes of methods and actual timings of signals to which the embodiments of the present disclosure relate.

DETAILED DESCRIPTION

Technical solutions in some embodiments of the present disclosure will be described clearly and completely below with reference to accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to." In the description, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, features defined with "first", "second" may explicitly or implicitly include one or more of the features. In the description of the embodiments of the present disclosure, the term "a/the plurality of" means two or more unless otherwise specified.

The phrase "A and/or B" includes the following three combinations: only A, only B, and a combination of A and B.

The use of the phrase "applicable to" or "configured to" means an open and inclusive expression, which does not exclude devices that are applicable to or configured to perform additional tasks or steps.

In addition, the use of "based on" means openness and inclusiveness, because processes, steps, calculations or other actions "based on" one or more of the stated conditions or values may be based on additional conditions or exceed the stated values in practice.

The term "approximately" as used herein includes a stated value and an average value within an acceptable range of deviation of a particular value. The acceptable range of deviation is determined by a person of ordinary skill in the art in view of the measurement in question and the error associated with the measurement of a particular quantity (i.e., the limitations of the measurement system).

Due to a reduction in a structural space of a display device and a reduction in a width of a frame of a display screen in the display device, a connection space between to an optical film and the frame in the display device is reduced. As a result, a problem that the optical film is prone to fall off may occur, and a display effect of the display device may be affected.

Figure 1:
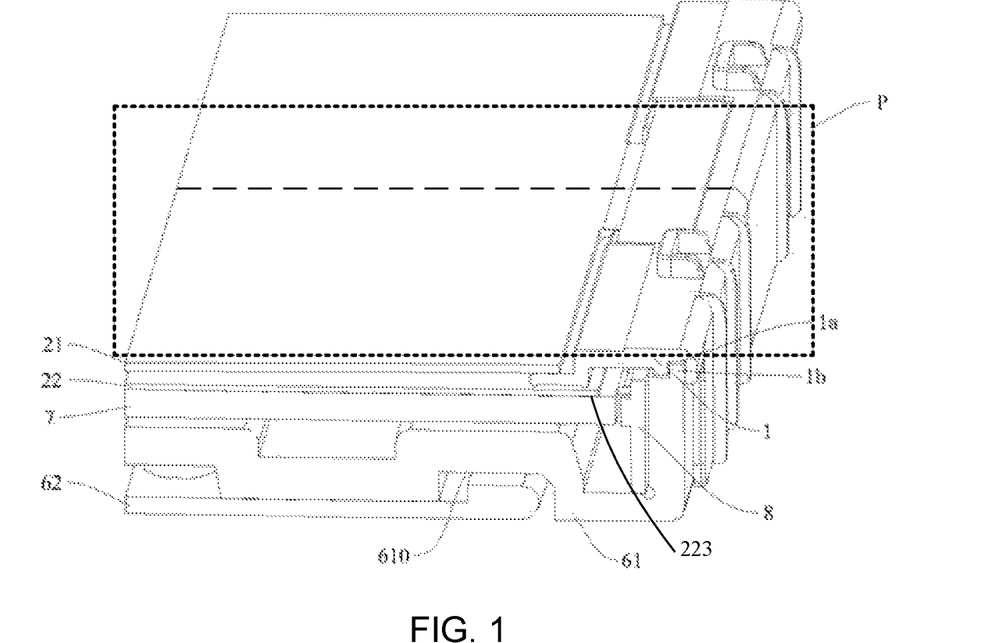
FIG. 1 is a structural diagram of a backlight module, in accordance with some embodiments of the present disclosure.
Figure 2:
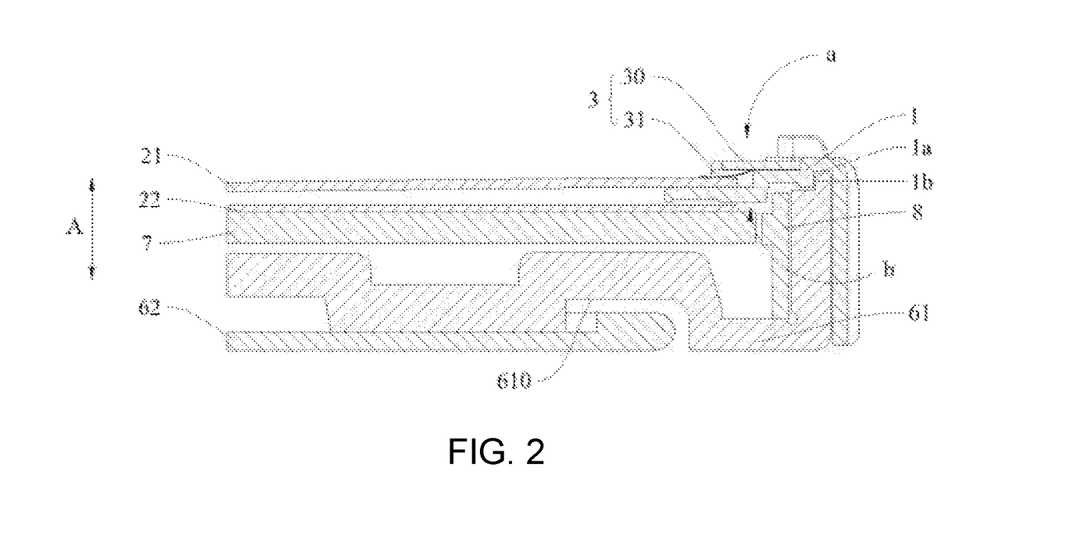
FIG. 2 is a sectional diagram of the backlight module in FIG. 1 along the plane P.

Some embodiments of the present disclosure provide a backlight module. FIG. 1 shows a portion of the backlight module 100, and FIG. 2 shows a sectional diagram of the backlight module 100 in FIG. 1 along the plane P. The backlight module 100 includes a frame 1, a first optical film 21 and a fixing assembly used to connect the frame 1 and the first optical film 21.

Figure 3:
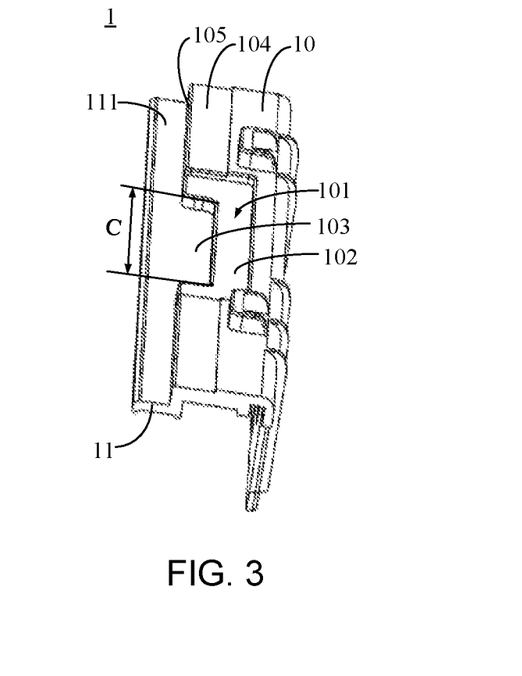
FIG. 3 is a structural diagram of a frame, in accordance with some embodiments of the present disclosure.

As shown in FIGS. 2 and 3, the frame 1 is an annular frame surrounding a display panel. The frame 1 has a near-display panel side a and a far-display panel side b in a direction A perpendicular to a plane enclosed by the frame 1. It can be noted that the near-display panel side a of the frame 1 in FIG. 2 is a side of the frame 1 proximate to a display panel of a display device in a case where the frame 1 is assembled into the display device, i.e., a side located above the frame 1. The far-display panel side b of the frame 1 is a side of the frame 1 away from the display panel of the display device, i.e., a side located below the frame 1.

Referring to FIG. 3, the frame 1 includes an annular frame portion 10 and an extending portion 11 disposed on an inside of the frame portion 10. The frame portion 10 has at least one film fixing groove 101, a cross section of the film fixing groove 101 has a stepped shape in a direction (i.e., the plane P in FIG. 1) perpendicular to a plane enclosed by the frame portion 10 and perpendicular to an edge 105 of the frame portion where the film fixing groove 101 is located. The film fixing groove 101 has a first support surface 102 and a second support surface 103, the second support surface 103 is farther away from the near-display panel side than the first support surface 102. The extending portion 11 has a third support surface 111, and the third support surface 111 is farther away from the near-display panel side than the first support surface 102.

It can be noted that the frame 1 is mostly used to support some plane structures. Therefore, the first support surface 102, the second support surface 103, the third support surface 111, and a fourth support surface 104 mentioned later may all be flat surfaces, so as to increase a support area and improve a support stability of the frame 1.

The film fixing groove 101 is disposed in the frame 1 to provide a space for connecting the optical film, which saves an internal space of the backlight module 100, and facilitates to realize a narrow frame and a thinness and light weight of the backlight module 100.

For example, as shown in FIGS. 2 and 3, the cross section of the film fixing groove 101 has the stepped shape, the first support surface 102 is located at a higher level of steps, and the second support surface 103 is located at a lower level of the steps.

For example, a material of the frame 1 may include a material such as plastic or silica gel to reduce a weight of the frame 1. Or, the material of the frame 1 may include a metal material, and embodiments of the present disclosure are not limited thereto.

For example, the extending portion 11 may has a continuous annulus shape, or may be in a shape of a plurality of discontinuous strips. In addition, the frame portion 10 and the extending portion 11 may be integrally formed to facilitate a preparation of the frame 1 and ensure structural strength of the frame 1.

Figure 4:
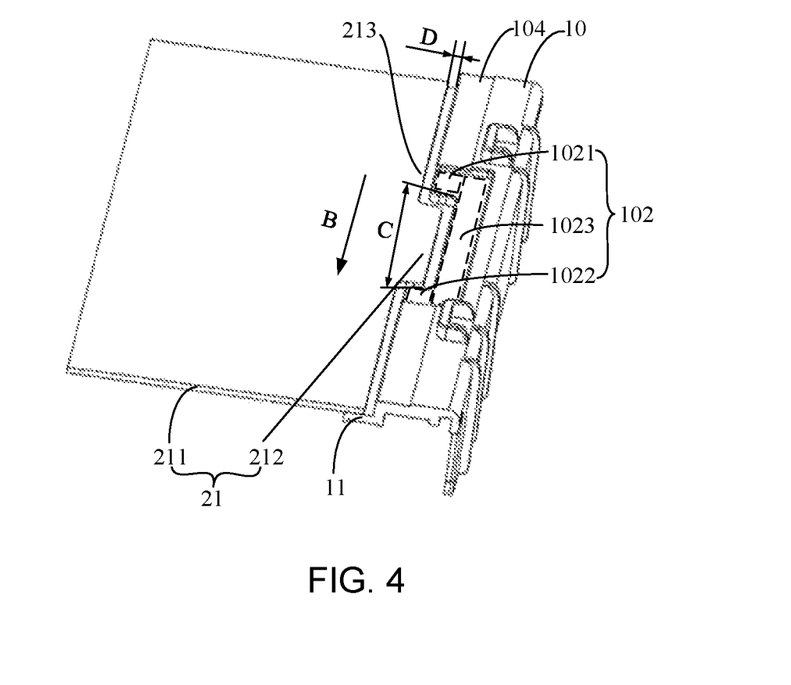
FIG. 4 is an assembly structural diagram of a frame and a first optical film, in accordance with some embodiments of the present disclosure.

As shown in FIGS. 3 and 4, the first optical film 21 includes a film body 211 and at least one protrusion portion 212 disposed at an edge 213 of the film body 211. The edge 213 of the film body 211 is supported by the third support surface 111. The protrusion portion 212 is connected to the edge 213 of the film body 211, and extends into the film fixing groove 101 and is supported by the second support surface 103.

It can be noted that the first optical film 21 may include one or more optical films, and each optical film may have a single-layer film structure or a multi-layer film composite structure. In a case where the first optical film 21 includes a plurality of optical films, the plurality of optical films are stacked on top of one another.

For example, the first optical film 21 is a QPP film, where "Q" represents a brightness enhancement film, and "P" represents a prism sheet. That is, the QPP film is a combination of a polarized brightness enhancement film and two prism sheets.

For example, as shown in FIG. 4, the film body 211 and the protrusion portion 212 may be integrally formed to facilitate a preparation of the first optical film 21 and to ensure connection strength between the film body 211 and the protrusion portion 212.

For example, the second support surface 103 and the third support surface 111 are located in a same plane. The edge 213 of the film body 211 is supported by the third support surface 111, and the protrusion portion 212 is supported by the second support surface 103, so that the film body 20 of the first optical film 21 has the same thickness as and is flush with the protrusion portion 212 of the first optical film 21 by arranging the second support surface 103 and the third support surface 111 in the same plane, that is, the second support surface 103 to be flush with the third support surface 111, which facilitates the preparation of the first optical film 21.

Figure 6:
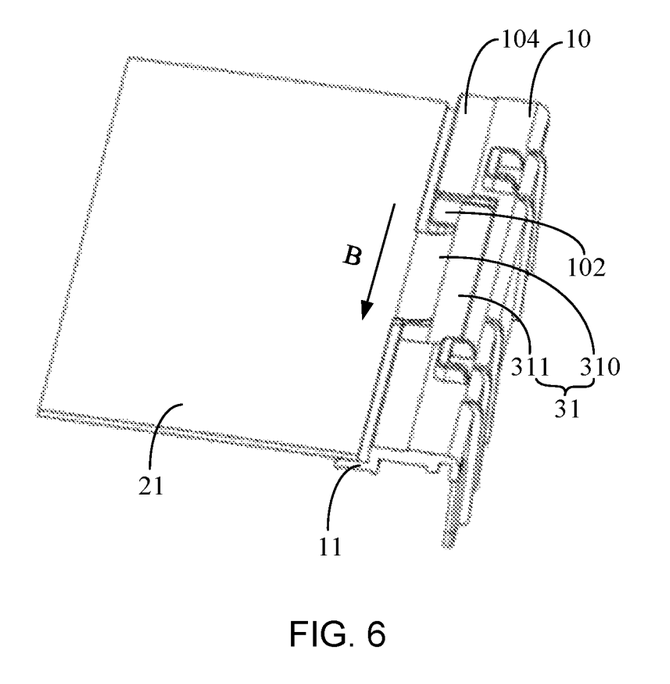
FIG. 6 is an assembly structural diagram of a frame, a first optical film and a connection sheet, in accordance with some embodiments of the present disclosure.
Figure 7:
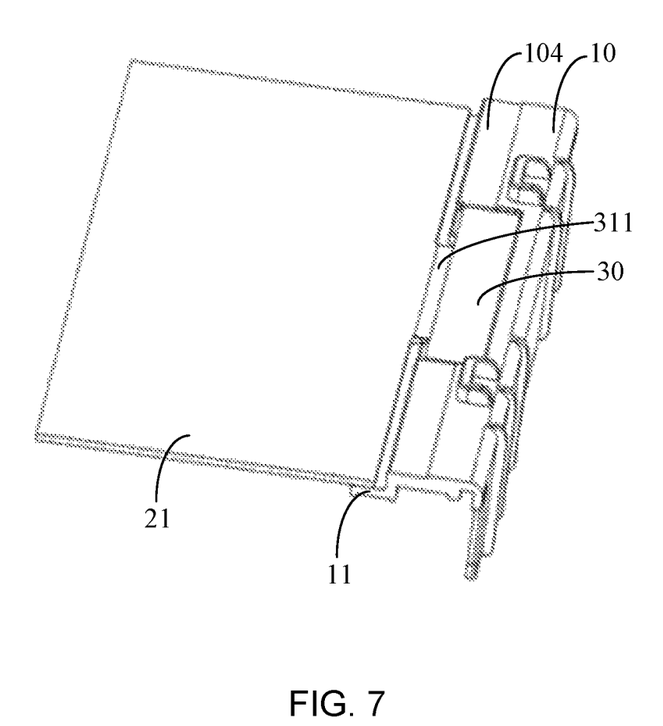
FIG. 7 is an assembly structural diagram of a frame, a first optical film and a fixing assembly, in accordance with some embodiments of the present disclosure.

As shown in FIGS. 2, 6 and 7, the fixing assembly 3 includes a fixing block 30 and a connection sheet 31. The fixing block 30 is supported by the first support surface 102, that is, the fixing block 30 is placed on the first support surface 102, so that the fixing block 30 is located in the film fixing groove 101 of the frame portion 10. One end of the connection sheet 31 is connected to the fixing block 30, and another end of the connection sheet 31 is connected to the protrusion portion 212 of the first optical film 21.

In the case where the first optical film 21 includes the plurality of optical films, the connection sheet 31 is connected to an uppermost optical film among the plurality of optical films.

In the backlight module 100 in the above embodiments of the present disclosure, the protrusion portion 212 of the first optical film 21 extends into the film fixing groove 101 and is supported by the second support surface 103. The protrusion portion 212 of the first optical film 21 is connected to the fixing block 30 through the connection sheet 31. The fixing block 30 is supported by the first support surface 102, and the fixing block 30 is located in the film fixing groove 101 of the frame portion 10 to press against the connection sheet 31. The connection sheet 31 is connected to the protrusion portion 212 of the first optical film 21, so as to realize fixation of the first optical film 21, and avoid a problem that the first optical film 21 falls off.

In some embodiments, as shown in FIGS. 3 and 7, the frame portion 10 further has a fourth support surface 104, the fourth support surface 104 is farther away from the far-display panel side than the first support surface 102, and the fourth support surface 104 is used for installing the display panel.

For example, a material of the fixing block 30 may include a silica gel material for filling the film fixing groove 101.

A surface of the fixing block 30 away from the first support surface 102 and the fourth support surface 104 are located in a same plane, so that a surface of the frame portion 10 is flat, and a stability of the display panel supported by the fourth support surface 104 of the frame portion 10 is ensured.

In some embodiments, as shown in FIG. 4, the first support surface 102 includes a first region 1021 and a second region 1022 disposed opposite to each other, and a connection region 1023 connecting the first region 1021 and the second region 1022.

For example, the first support surface 102 has a U-shape.

As shown in FIGS. 4 and 7, an orthogonal projection of the fixing block 30 on a plane where the first support surface 102 is located at least partially overlaps with any region of the first region 1021, the second region 1022 and the connection region 1023 to increase an area of the fixing block 30 supported by the first support surface 102, thereby improving connection strength between the fixing block 30 and the film fixing groove 101 of the frame portion 10.

For example, the orthogonal projection of the fixing block 30 on the plane where the first support surface 102 is located partially overlaps with the first region 1021, and partially overlaps with the second region 1022, and the connection region 1023 is within the orthogonal projection of the fixing block 30 on the plane where the first support surface 102 is located.

As shown in FIGS. 3 and 4, an orthogonal projection of the second support surface 103 on the plane where the first support surface 102 is located is located between the first region 1021 and the second region 1022. That is, an orthogonal projection of a portion of the second support surface 103 that supports the protrusion portion 212 on the plane where the first support surface 102 is located is located between the first region 1021 and the second region 1022.

In some embodiments, the fixing block 30 is connected to the first support surface 102, for example, the fixing block 30 is bonded to the first support surface 102, which may further improve the connection strength between the fixing block 30 and the first support surface 102, thereby improving the connection strength between the fixing block 30 and the fixing groove 101 of the frame portion 10.

Figure 5:
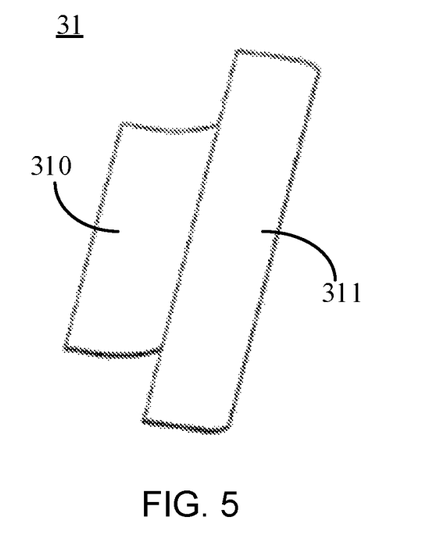
FIG. 5 is a structural diagram of a connection sheet, in accordance with some embodiments of the present disclosure.

In some embodiments, as shown in FIGS. 5 and 6, the connection sheet 31 includes a first connection portion 310 and a second connection portion 311. The first connection portion 310 is connected to the protrusion portion 212 of the first optical film 21. The second connection portion 311 is located between the fixing block 30 and the connection region 1023 of the first support surface 102.

For example, the first connection portion 310 and the second connection portion 311 may be integrally formed to ensure the structural strength of the connection sheet 31.

For example, the first connection portion 310 is bonded to a surface of the protrusion portion 212 of the first optical film 21.

In some embodiments, as shown in FIGS. 6 and 7, the fixing block 30 is configured to press the second connection portion 311 on the first support surface 102. The fixing block 30 is subjected to gravity, and the second connection portion 311 is pressed on the first support surface 102 through the fixing block 30 to realize a fixation between the second connection portion 311 and the first support surface 102, thereby preventing the connection sheet 31 from loosening due to shock or impact caused by a fall of the display device.

In some embodiments, the second connection portion 311 is connected to the fixing block 30. For example, the second connection portion 311 may be bonded to the fixing block 30 to ensure the connection strength between the second connection portion 311 and the fixing block 30.

In some embodiments, the fixing block 30 is configured to press the second connection portion 311 on the first support surface 102, and the second connection portion 311 is connected to the fixing block 30, so as to improve the connection strength between the second connection portion 311 and the fixing block 30.

In some embodiments, as shown in FIGS. 4 and 6, a dimension of the first connection portion 310 is approximately equal to a dimension of the protrusion portion 212 in a direction B from the first region 1021 to the second region 1022.

Through the above arrangement, the dimension of the first connection portion 310 is made relatively large in the direction B, so as to increase the connection area between the first connecting portion 310 and the protrusion portion 212, thereby increasing the connection strength between the first connecting portion 310 and the protrusion portion 212.

In some embodiments, as shown in FIGS. 4 and 6, an orthogonal projection of the second connection portion 311 on the plane where the first support surface 102 is located covers the connection region 1023 to ensure a contact area between the second connection portion 311 and the connection region 1023.

In some embodiments, as shown in FIGS. 4, 6 and 7, the connection region 1023 is within the orthogonal projection of the second connection portion 311 on the plane where the first support surface 102 is located, but the first region 1021 and the second region 1022 are not within the orthogonal projection of the second connection portion 311 on the plane where the first support surface 102 is located. In this case, the first region 1021 and the fixing block 30, and the second region 1022 and the fixing block 30 are both bonded by an adhesive layer, and a thickness of the adhesive layer is greater than or equal to a thickness of the second connection portion 311.

In the above embodiments of the present disclosure, since the second connection portion 311 has a thickness, and the fixing block 30 presses the second connection portion 311 on the first support surface 102, a fixing block 30 has a gap from the first region 1021 and also has a gap from the second region 1022. The adhesive layer is disposed between the first region 1021 and the fixing block 30, and between the second region 1022 and the fixing block 30, and the thickness of the adhesive layer is greater than or equal to the thickness of the second connection portion 311. In this way, the gap between the fixing block 30 and the first region 1021, and the gap between the fixing block 30 and the second region 1022 may be filled, the connection strength between the fixing block 30 and the first support surface 102 may be improved, and the connection strength between the second connection portion 311 and the fixing block 30 may be improved.

In some embodiments, as shown in FIGS. 2, 4, and 6, the connection sheet 31 has flexibility, and the thickness of the protrusion portion 212 is less than a distance between the second support surface 103 and the first support surface 102 in a direction (which is the same as the direction A perpendicular to the plane enclosed by the frame 1) perpendicular to a plane where the first optical film 21 is located.

Through the above arrangement, the thickness of the protrusion portion 212 is less than the distance between the second support surface 103 and the first support surface 102, that is, there is a height difference between an upper surface of the protrusion 212 and the first support surface 102. Since the connection sheet 31 has flexibility, the first connection portion 310 of the connection sheet 31 will sag toward the second support surface 103 due to gravity, which may provide space for movement of deformation caused by a force to which the connection sheet 31 is subjected.

For example, the connection sheet 31 may be Mylar sheet. The Mylar sheet is a film formed by heating terephthalic acid, dimethyl ester and ethylene glycol under action of related catalysts, and then through transesterification, vacuum polycondensation, and biaxial stretching. The Mylar sheet is very thin and has a good tensile property.

In some embodiments, colors of the connection sheet 31 and the fixing block 30 are the same as a color of the first optical film 21, so as to avoid a visual difference caused by a chromatic aberration among the connection sheet 31, the fixing block 30 and the first optical film 21. For example, the connection sheet 31, the fixing block 30 and the first optical film 21 may all have white color, and may also have other colors, for example milky white or light yellow, which is not limited in embodiments of the present disclosure.

In some embodiments, as shown in FIG. 4, the dimension of the protrusion portion 212 is less than a distance C between the first region 1021 and the second region 1022 in the direction B from the first region 1021 to the second region 1022.

As an operating temperature of the backlight module changes, the protrusion portion 212 of the first optical film 21 will expand or contract. Through the above arrangement, the protrusion 212 has the space for movement between the first region 1021 and the second region 1022 (i.e., on the second support surface 103) in the direction B from the first region 1021 to the second region 1022, which provides the space for movement of the protrusion portion 212 of the first optical film 21 when the protrusion 212 expands or contracts, so as to avoid affecting an optical performance of the first optical film 21.

For example, in the direction B from the first region 1021 to the second region 1022, the dimension of the protrusion portion 212 is less than the distance C between the first region 1021 and the second region, and there is the space for movement between the protrusion portion 212 and the first region 1021, and between the protrusion portion 212 and the second region 1022.

In some examples, as shown in FIG. 4, the film body 211 and the frame portion 10 have a distance D therebetween.

As the operating temperature of the backlight module changes, the film body 211 will also expand or contract. The distance D between the film body 211 and the frame portion 10 provides space for movement of the film body 211 when the film body 211 expands and contracts, so as to avoid affecting the optical performance of the first optical film 21.

Figure 8:
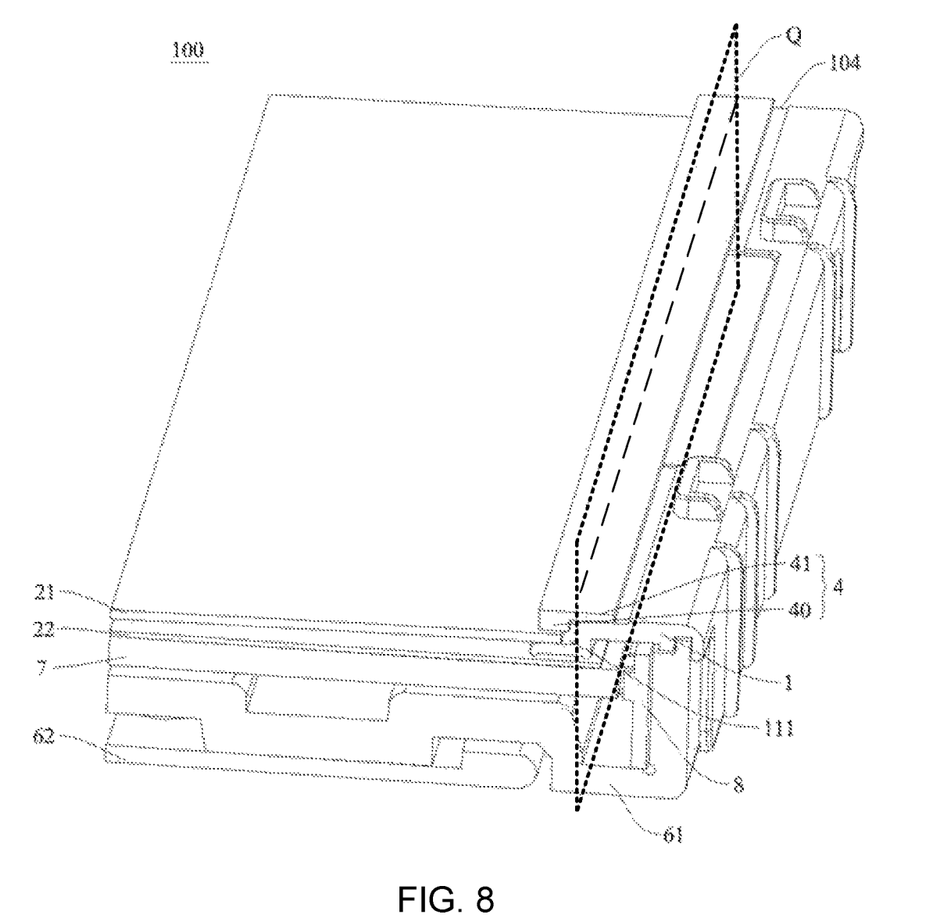
FIG. 8 is an assembly structural diagram of a frame, a first optical film, a fixing assembly and a shielding component are fitted together, in accordance with some embodiments of the present disclosure.
Figure 9:
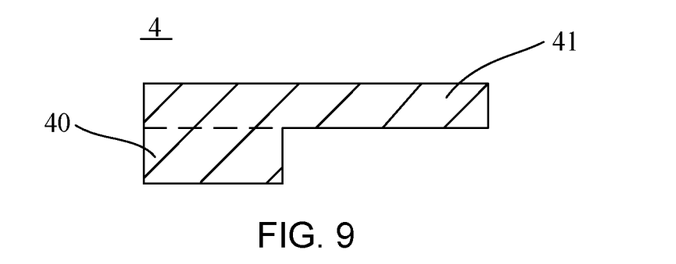
FIG. 9 is a structural diagram of a shielding component, in accordance with some embodiments of the present disclosure.
Figure 11:
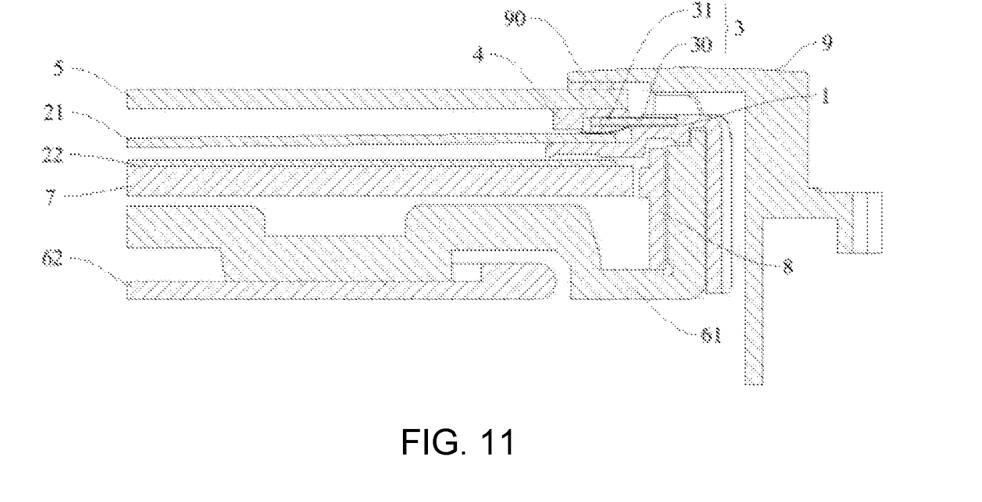
FIG. 11 is a sectional diagram of the display device along the plane M in FIG. 10.

In some embodiments, as shown in FIGS. 8, 9 and 11, the backlight module 100 further includes a shielding component 4, the shielding component 4 includes a shielding portion 40 and a carrying portion 41. An orthogonal projection of the shielding portion 40 on the plane where the first optical film 21 is located covers a portion of the edge 213 of the film body 211 of the first optical film 21. One end of the carrying portion 41 is connected to a surface of the shielding portion 40 away from the first optical film 21, and another end of the carrying portion 41 extends to a position where the fourth support surface 104 is located and is supported by the fourth support surface 104. The carrying portion 41 is configured to support the display panel.

An orthogonal projection of the shielding portion 40 on a reference plane Q covers at least an orthogonal projection of the fixing block 30 of the fixing assembly 3 on the reference plane Q, and an orthographic projection of the shielding portion 40 on a plane where the third support surface 111 is located in the third supporting surface 111.

An orthogonal projection of the carrying portion 41 on the plane where the first optical film 21 is located covers the protrusion portion 212.

It can be noted that the reference plane Q is a plane perpendicular to a direction in which the carrying portion 41 extends to the position where the fourth support surface 104 is located.

For example, as shown in FIG. 11, the orthogonal projection of the shielding portion 40 on the reference plane Q covers the orthogonal projection of the fixing block 30 of the fixing assembly 3, and covers a portion of an orthogonal projection of the connection sheet 31 on the reference plane Q. For another example, the orthogonal projection of the shielding portion 40 on the reference plane Q covers an orthogonal projection of the fixing assembly 3 on the reference plane Q, and embodiments of the present disclosure are not limited to this.

For example, a cross section of the shielding component 4 has an L-shape. The shielding portion 40 and the carrying portion 41 may be integrally formed to facilitate a preparation of the shielding portion 40, and to ensure the structural strength of the shielding component 4. A dotted line in the shielding component 4 indicates a plane in which shielding portion 40 connects to the carrying portion 41 in FIG. 8, the plane of connection is set forth to more clearly describe structures of the shielding portion 40 and the carrying portion 41 in the shielding component 4 and a connection relationship therebetween. In a case where the shielding portion 40 and the carrying portion 41 are integrally formed, the plane may be a virtual plane.

In the above embodiments of the present disclosure, the shielding component 4 is disposed on a side of the backlight module 100 where the fixing assembly 3 is disposed, and the orthogonal projection of the shielding portion 40 on the reference plane Q covers at least the orthogonal projection of the fixing block 30 of the fixing assembly 3 on the reference plane Q, so as to shield of the fixing block 30 of the fixing assembly 3. The orthogonal projection of the shielding portion 40 on the plane where the third support surface 111 is located is in the third support surface 111, and the orthogonal projection of the carrying portion 41 on the plane where the first optical film 21 is located covers the protrusion portion 212, so as to shield the protrusion portion 212 and to avoid exposing the protrusion portion 212 of the first optical film 21 and the fixing assembly 3 at a large angle. Thereby, a problem of local bright lines at a position where the first optical film 21 is connected to the fixing assembly 3 may be avoided, consistency of the optical performance of the first optical film 21 may be ensured, and a good display effect of the display device may be ensured.

Moreover, the orthogonal projection of the shielding portion 40 on the plane where the first optical film 21 is located covers the portion of the edge 213 of the film body 211, that is, the shielding portion 40 is located above the film body 211 to limit an upward displacement of the first optical film 21, which may avoid the problem that the first optical film 21 falls off.

In addition, the carrying portion 41 is used to support the display panel, and the effective area for supporting the display panel may be increased by the carrying portion 41 to ensure the installation stability of the display panel.

In some embodiments, as shown in FIGS. 8, 9 and 11, in order to provide a margin for assembling the shielding portion 40 and the first optical film 21, the shielding portion 40 of the shielding component 4 and the first optical film 21 are provided with a gap therebetween. It is possible to prevent the shielding portion 40 of the shielding component 4 from contacting the first optical film 21 under stress, which may avoid affecting the optical performance of the first optical film 21.

In some embodiments, a material of the shielding component 4 includes a silica gel material. A texture of the shielding component 4 is relatively soft, which may prevent the shielding component 4 from damaging the display panel.

A backlight module includes a light guide plate, a plurality of optical films in the to backlight module are placed on the light guide plate, and the plurality of optical films are pressed on the light guide plate through an plastic frame to prevent the plurality of optical films from falling off. Since areas of the plurality of optical films are different, the plastic frame needs to have a relatively large width to ensure an area of the plastic frame that is pressed against the plurality of optical films, and to ensure stability of the plastic frame pressing the plurality of optical films on the light guide plate. However, the above arrangement is not conducive to the narrow frame of the display device.

Based on this, in some embodiments, as shown in FIGS. 1 to 3, the backlight module 100 further includes a light guide plate 7 disposed on the far-display panel side of the frame 1, and a second optical film 22 disposed between the light guide plate 7 and the frame 1. An edge 223 of the second optical film 22 is pressed on the light guide plate 7 through the extending portion 11 of the frame 1.

It can be noted that the second optical film 22 may include one or more optical films, and each optical film may have a single-layer film structure or a multi-layer film composite structure.

For example, the second optical film 22 includes a brightness enhancement film, and/or a diffusion film. The embodiments of the present disclosure are not limited thereto.

In the above embodiments of the present disclosure, the first optical film 21 is fixed on the near-display panel side a of the frame 1 through the fixing assembly 3, and the second optical film 22 is fixed between the frame 1 and the light guide plate 7. In this way, the plurality of optical films originally fixed between the frame 1 and the light guide plate 7 are divided into two parts, one part is fixed on the near-display panel side a of the frame 1, and the other part is fixed on the far-display panel side b of the frame 1. As a result, the thickness of the optical film fixed between the frame 1 and the light guide plate 7 may be reduced, a problem that the optical film falls off due to a large thickness of the optical film fixed between the frame 1 and the light guide plate 7 may be avoided. Moreover, since the number of optical films fixed between the frame 1 and the light guide plate 7 is reduced, the area of the optical films that needs to be pressed by the frame 1 is reduced, which is beneficial to reduce a width of the frame 1, and may realize a design of narrow frame.

In some embodiments, as shown in FIGS. 1 and 2, the backlight module 100 further includes a backlight source 8, and the backlight source 8 is disposed on a side of the light guide plate 7. That is, the backlight module 100 in the embodiments of the present disclosure has an edge-lit backlight source structure. The fixing assembly 3 is disposed on a side of the backlight module 100 where the backlight source 8 is disposed, e.g., a ground side of the display device (a side of the display device proximate to the ground).

In some embodiments, the backlight module 100 may also has a direct-lit backlight source structure, and the embodiments of the present disclosure are not limited thereto.

In some embodiments, as shown in FIGS. 1 and 2, the backlight module 100 further includes a heat sink 61 and a backplate 62. The heat sink 61 is provided with a groove 610, and the backplate 62 may be embedded in the groove 610 of the heat sink 61, which may reduce a thickness of the backlight module 100, thereby realizing a lightness and thinness of the backlight module 100.

The backlight source 8 is installed on the heat sink 61, and heat generated by the backlight source 8 may be conducted to the backplane 62 and an external environment through the heat sink 61, which is beneficial to heat dissipation of the backlight module 100.

A clamping groove 1a is disposed on the far-display panel side of the frame 1, an end of the heat sink 61 proximate to the frame 1 has a bump 1b correspondingly, and an installation stability of the frame 1 may be improved by coordinating of the bump 1b of the heat sink 61 and the clamping groove 1a of the frame 1.

Some embodiments of the present disclosure further provide a display device, the display device may be a liquid crystal display (LCD) device.

Figure 10:
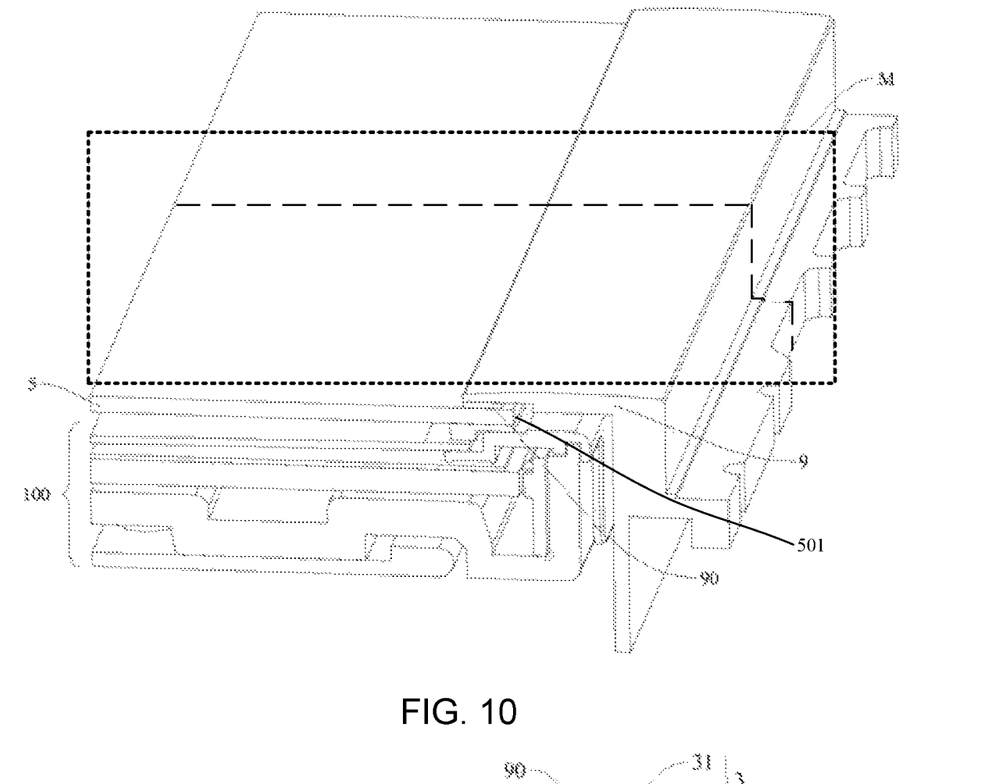
FIG. 10 is a structural diagram of a display device, in accordance with some embodiments of the present disclosure.

In some embodiments, as shown in FIGS. 10 and 11, the display device 200 includes the backlight module 100 as described above, and a display panel 5 disposed on the near-display panel side of the frame 1. An edge 501 of the display panel 5 is supported by the frame portion 10 of the frame 1. For example, the display panel 5 is liquid crystal display panel (open cell (OC)). The backlight module 100 is used to provide light required for displaying images to the liquid crystal display panel 5.

For example, as shown in FIGS. 8 and 10, the shielding component 4 is installed on the frame 1, and the edge 501 of the display panel 5 is supported by the carrying portion 41 of the shielding component 4 to ensure installation stability of the display panel 5.

In some embodiments, the display device 200 further includes a front frame 9, the front frame 9 is disposed at a circumference of the display panel 5, and the front frame 9 is partially pressed against the edge 501 of the display panel 5 to prevent the display panel 5 from falling off.

For example, as shown in FIGS. 10 and 11, a protective strip 90 is provided between the display panel 5 and the front frame 9 to prevent the display panel 5 from being damaged due to a pressing of the front frame 9 on the display panel 5, and plays a to role in protecting the display panel 5.

In the display device 200 provided by the embodiments of the present disclosure, the first optical film 21 is fixedly connected to the frame 1 through the fixing assembly 3, so as to realize the fixation of the first optical film 21, which avoids the problem of the first optical film 21 from falling off, thereby ensuring an excellent display effect of the display device 200.

The above display device 200 may be a high transmission rate advanced super dimension switch (HADS) type liquid crystal display device, and may also be an advanced super dimension switch (ADS) type liquid crystal display device, an in-plane switching (IPS) type liquid crystal display device, a fringe field switching (FFS) type liquid crystal display device, a twisted nematic (TN) type liquid crystal display device, a multi-domain vertical alignment (MVA) type liquid crystal display device, or a patterned vertical alignment (PVA) type liquid crystal display device.

The display device 200 may be any device that displays images whether in motion (e.g., a video) or stationary (e.g., a static image), and whether literal or graphical. More specifically, it is anticipated that the described embodiments may be implemented in or associated with a variety of electronic devices. The variety of electronic devices may (but not limit to), for example, a mobile telephone, a wireless device, a personal data assistant (PAD), a hand-held or portable computer, a global positioning system (GPS) receiver/navigator, a camera, a MPEG-4 Part 14 (MP4) video player, a video camera, a game console, a watch, a clock, a calculator, a TV monitor, a flat-panel display, a computer monitor, a car display (such as an odometer display), a navigator, a cockpit controller and/or display, a camera view display (such as a rear view camera display in a vehicle), an electronic photo, an electronic billboard or sign, a projector, a building structure, and a packaging and an aesthetic structure (such as a display for an image of a piece of jewelry).

The above are merely specific implementation manners of the present disclosure, but the protection scope of the present disclosure is not limited thereto, and any changes or replacements that a person skilled in the art could conceive of within the technical scope of the present disclosure should be within the protection scope of the present disclosure. Therefore, the protection scope of the present disclosure shall be subject to the protection scope of the claims.

What is claimed is:

1. A backlight module, comprising:
a frame having a near-display panel side and a far-display panel side in a direction perpendicular to a plane enclosed by the frame, the frame including:
a frame portion having at least one film fixing groove, a cross section of the film fixing groove having a stepped shape in a direction perpendicular to a plane enclosed by the frame portion and perpendicular to an edge of the frame portion where the film fixing groove is located; the film fixing groove having a first support surface and a second support surface, and the second support surface being farther away from the near-display panel side than the first support surface; and
an extending portion disposed on an inside of the frame portion; the extending portion having a third support surface, and the third support surface being farther away from the near-display panel side than the first support surface;
a first optical film, the first optical film including:
a film body, an edge of the film body being supported by the third support surface; and
at least one protrusion portion disposed on the edge of the film body, the protrusion portion being connected to the edge of the film body, extending into the film fixing groove and being supported by the second support surface; and
a fixing assembly, the fixing assembly including:
a fixing block supported by the first support surface; and
a connection sheet, one end of the connection sheet being connected to the fixing block, and another end of the connection sheet being connected to the protrusion portion of the first optical film.

2. The backlight module according to claim 1, wherein the frame portion further has a fourth support surface, and the fourth support surface is farther away from the far-display panel side than the first support surface; and
a surface of the fixing block away from the first support surface and the fourth support surface are located in a same plane.

3. The backlight module according to claim 1, wherein the first support surface includes a first region and a second region that are disposed opposite to each other, and a connection region connecting the first region and the second region;
an orthogonal projection of the fixing block on a plane where the first support surface is located and any region of the first region, the second region and the connection region have an overlapping region; and
an orthogonal projection of the second support surface on the plane where the first support surface is located is located between the first region and the second region.

4. The backlight module according to claim 3, wherein the connection sheet includes a first connection portion and a second portion;
the first connection portion is connected to the protrusion portion of the first optical film; and
the second connection portion is located between the fixing block and the connection region of the first support surface.

5. The backlight module according to claim 4, wherein the fixing block is configured to press the second connection portion on the first support surface.

6. The backlight module according to claim 4, wherein a dimension of the first connection portion is approximately equal to a dimension of the protrusion portion in a direction from the first region to the second region.

7. The backlight module according to claim 4, wherein the connection region is within an orthogonal projection of the second connection portion on the plane where the first support surface is located.

8. The backlight module according to claim 3, wherein a dimension of the protrusion portion is less than a distance between the first region and the second region in a direction from the first region to the second region.

9. The backlight module according to claim 8, wherein the film body and the frame portion have a distance therebetween.

10. The backlight module according to claim 2, further comprising a shielding component, the shielding component including:
a shielding portion, a portion of the edge of the film body being within an orthogonal projection of the shielding portion on a plane where the first optical film is located;
a carrying portion, one end of the carrying portion being connected to a surface of the shielding portion away from the first optical film, and another end of the carrying portion extending to a position where the fourth support surface is located and being supported by the fourth support surface, wherein
an orthogonal projection of the fixing block of the fixing assembly on the reference surface is within an orthogonal projection of the shielding portion on a reference surface; and the reference plane is a plane perpendicular to a direction in which the carrying portion extends to the position where the fourth support surface is located; and
the protrusion portion is within an orthogonal projection of the carrying portion on the plane where the first optical film is located.

11. The backlight module according to claim 10, wherein an orthogonal projection of the shielding portion on a plane where the third support surface is located is in the third support surface.

12. The backlight module according to claim 3, wherein the fixing block is connected to the first support surface.

13. The backlight module according to claim 12, further comprising an adhesive layer bonding both the first region and the fixing block, and the second region and the fixing block, a thickness of the adhesive layer being greater than or equal to a thickness of the second connection portion.

14. The backlight module according to claim 1, wherein the connection sheet is flexible, and a thickness of the protrusion portion is less than a distance between the second support surface and the first support surface in a direction perpendicular to a plane where the first optical film is located.

15. The backlight module according to claim 1, wherein the connection sheet is made of polyester.

16. The backlight module according to claim 1, wherein colors of the connection sheet and the fixing block are same as a color of the first optical film.

17. The backlight module according to claim 1, wherein the second support surface and the third support surface are located in a same plane.

18. The backlight module according to claim 1, further comprising:

a light guide plate disposed on the far-display panel side of the frame; and     a second optical film disposed between the light guide plate and the frame, an edge of the second optical film being pressed on the light guide plate by the extending portion of the frame.

19. The backlight module according to claim 18, further comprising:

a backlight source disposed on a side of the light guide plate;

the fixing assembly being disposed on a side of the backlight module where the backlight source is disposed.

20. A display device, comprising:

the backlight module according to claim 1; and a display panel disposed on the near-display panel side of the frame, an edge of the display panel being supported by the frame portion of the frame.

* * * * *